US008848562B2

(12) United States Patent
Kotecha et al.

(10) Patent No.: US 8,848,562 B2
(45) Date of Patent: Sep. 30, 2014

(54) MODIFYING FEC VALUES AND MCS VALUES IN A NETWORK

(75) Inventors: Lalit Kotecha, San Ramon, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 297 days.

(21) Appl. No.: 13/401,871

(22) Filed: Feb. 22, 2012

(65) Prior Publication Data

US 2013/0215813 A1 Aug. 22, 2013

(51) Int. Cl.
*H04L 12/28* (2006.01)
*H04J 3/16* (2006.01)
*H04B 17/00* (2006.01)
*H04W 72/00* (2009.01)

(52) U.S. Cl.
USPC ........ 370/252; 370/390; 370/437; 455/67.13; 455/452.2

(58) Field of Classification Search
CPC ............................ H04L 1/0003; H04L 1/0016
USPC .......................... 370/252, 312, 390, 432, 437; 455/67.11, 67.13, 452.2
See application file for complete search history.

(56) References Cited

U.S. PATENT DOCUMENTS

| | | | | |
|---|---|---|---|---|
| 7,623,490 | B2* | 11/2009 | Khandekar et al. | 370/329 |
| 7,970,920 | B1* | 6/2011 | Dinan | 709/230 |
| 2008/0043657 | A1* | 2/2008 | Ishii et al. | 370/311 |
| 2008/0250294 | A1* | 10/2008 | Ngo et al. | 714/752 |
| 2011/0038272 | A1* | 2/2011 | Hadad et al. | 370/252 |
| 2013/0263201 | A1* | 10/2013 | Chung-How et al. | 725/116 |

* cited by examiner

*Primary Examiner* — Redentor Pasia

(57) ABSTRACT

A method includes receiving an indication of current quality of service for a transmission received by user equipment from a base station. The method includes identifying target quality of service values for the transmission. A current FEC value and a current MCS value is identified for the transmission. An adjusted FEC value and an adjusted MCS value is determined based on the current FEC value and the current MCS value, the indication of current quality of service, and the target quality of service values. The method includes outputting the adjusted FEC value to a broadcast multicast service center for the transmission. The method also includes outputting the adjusted MCS value to the base station.

20 Claims, 7 Drawing Sheets

US 8,848,562 B2

MODIFYING FEC VALUES AND MCS VALUES IN A NETWORK

BACKGROUND

Mobile broadcast and multicast systems typically use a fixed radio modulation scheme, known as a modulation and coding scheme (MCS), to provide unified decoding of content from signals received within a cell coverage area. Additionally, a forward error correction (FEC) scheme may be applied to the signal at an application level to provide additional protection against packet loss. The FEC scheme provides data reliability by introducing a known structure into a data sequence prior to transmission. However, the FEC scheme introduces an additional overhead for the transmission.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide error protection in a long term evolution (LTE) network by providing feedback associated with FEC and MCS values for the network based on transmissions of broadcasts/multicasts received at base stations in the network. The adjusted FEC and MCS values may be selected in a feedback loop to optimize the performance of multicast/broadcast services at a radio cell edge.

Figure 1:
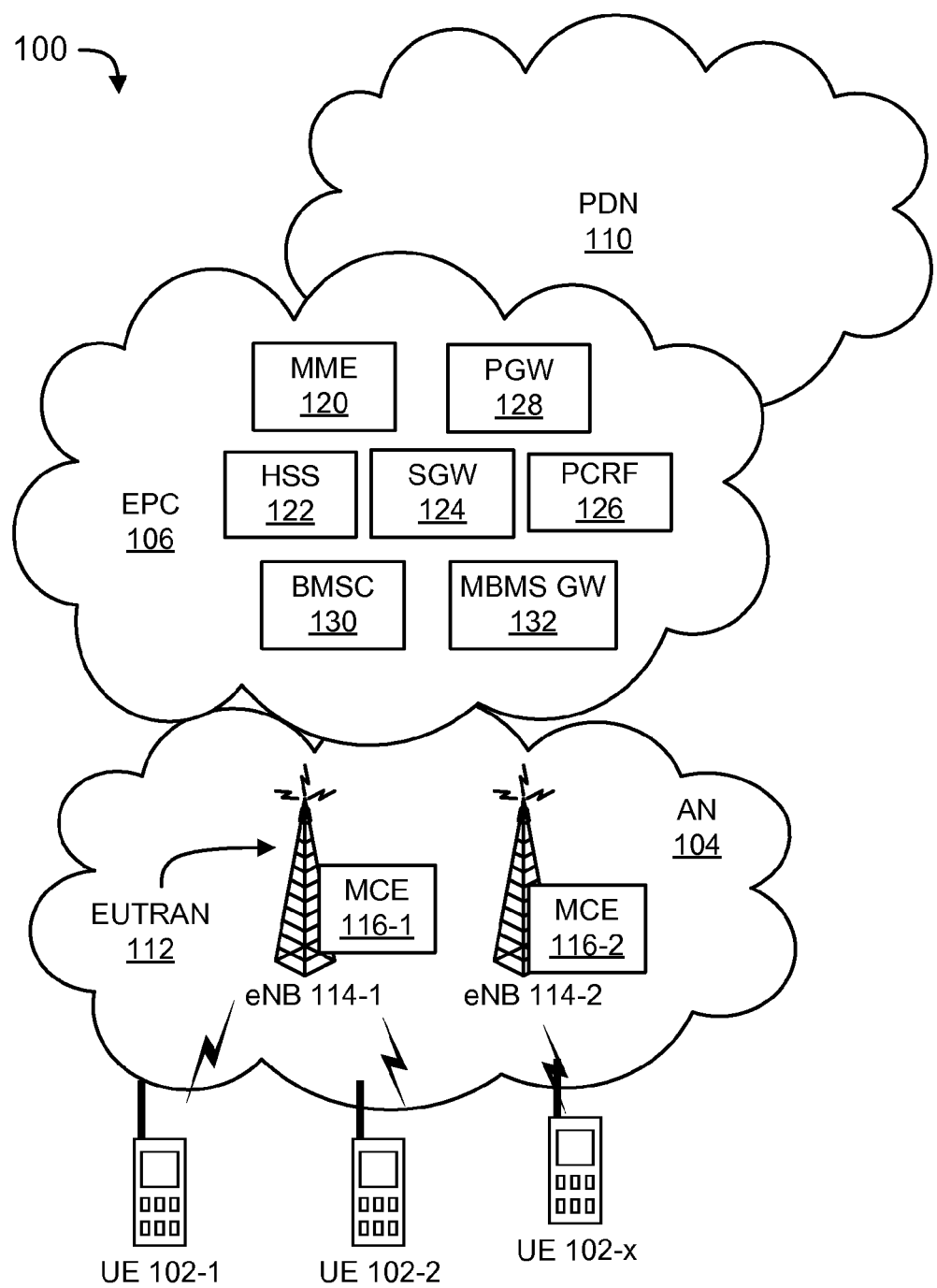
FIG. 1 is an exemplary long term evolution (LTE) network in which systems and/or methods described herein may be implemented.

FIG. 1 is a diagram of an exemplary LTE network 100. As illustrated, LTE network 100 includes a number of user equipment (UE) devices 102-1, 102-2 and 102-*x* (collectively referred to as UEs 102 or individually as UE 102), an access network (AN) 104, an evolved packet core (EPC) network 106, and a packet data network (PDN) 110, such as the Internet or a proprietary packet data network. AN 104 may include an evolved universal terrestrial radio access network (E-UTRAN) 112 and a number of eNodeBs (eNBs) 114-1 and 114-2 or enhanced node base stations (collectively referred to as eNBs 114 or individually as eNB 114). Each eNB 114 may include a corresponding multicast coordination entity (MCE) 116 (respectively MCE 116-1, 116-2 and 116-*x*, collectively referred to as MCEs 116 or individually as MCE 116). EPC 106 may include a mobility management entity (MME) 120, a home subscriber server (HSS)/authentication, authorization, and accounting (AAA) server 122, a serving gateway (SGW) 124, policy and charging rules function (PCRF) device 126, a PDN gateway (PGW) 128, a broadcast multicast service center (BMSC) 130, and a multimedia broadcast multicast service gateway (MBMS GW) 132. Devices/networks of network 100 may interconnect via wired and/or wireless connections.

Three UEs 102, AN 104, EPC 106, PDN 110, E-UTRAN 112, two eNBs 114, MME 120, HSS 122, SGW 124, PCRF 126, PGW 128, BMSC 130, and MBMS GW 132 have been illustrated in FIG. 1 for simplicity. In practice, there may be more or fewer devices or components. For example, a typical network 100 includes millions of subscriber UEs 102, thousands of eNBs 114, hundreds of SGWs 124 and several PGWs 128 and MBMS GWs 130 effectively forming a hierarchical access network in which traffic passes from PDN 110 to UE 102 via, for example, a particular MBMS GW 132, PGW 128, SGW 124, and eNB 114.

UE 102 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a tablet computer, or other types of computation or communication devices. In an exemplary implementation, UEs 102 may include any device that is capable of communicating over access network 104, EPC network 106, and/or PDN 110. UE 102 operates according to one or more versions of the LTE communication standard.

Access network 104 includes a communications network that connects subscribers (e.g., UE 102) to a service provider. In one example, access network 104 may include a WiFi network or other access networks (e.g., in addition to E-UTRAN 112). EPC 106 may include a core network architecture of the Third generation partnership project (3GPP) LTE wireless communication standard. PDN 110 includes a network that provides data services (e.g., via packets or any other Internet protocol (IP) datagrams). For example, PDN 110 may include the Internet, an intranet, an asynchronous transfer mode (ATM) network, etc.

E-UTRAN 112 includes a radio access network capable of supporting high data rates, packet optimization, large capacity and coverage, etc. E-UTRAN 112 includes a plurality of eNBs 14.

eNBs 114 includes network devices that operate according to one or more versions of the LTE communication standard. For example, eNBs 114 may be configured to respond to UE requests, forward information regarding UEs 102 to MME 120 and/or SGW 124, set up tunneling sessions with other devices (e.g., SGW 124 and PGW 128), etc. eNBs 114 are base stations in network 100 and may include control plane connections to other network elements. eNBs 114 may include MCEs 116.

MCEs 116 may allocate radio resources used by all eNBs 114 in the multicast/broadcast single frequency network (MBSFN) area for multi-cell MBMS transmissions using MBSFN operations. The MBSFN area is a specific area in which multiple cells transmit the same content using a single frequency network. Each eNB 114 may have an associated MCE 116, which may be integrated into the eNB 114. Alternatively, MCEs 116 may be part of another network element. When the MCE 116 is part of another network element, each eNB 114 is served by a single MCE 116. In addition to allocation of the time/frequency radio resources, MCEs 116 may also determine or implement further details of the radio configuration, such as the MCS. The MCE may also be involved in MBMS session control signaling.

MME 120 is responsible for idle mode tracking and paging procedures (e.g., including retransmissions) for UE 102. For example, MME 120 maintains information regarding a current state (e.g., powered on, location, etc.) of UE 102. MME 120 is also involved in the bearer activation/deactivation process (e.g., for UE 102) and operates to choose a particular SGW 124 for UE 102 at an initial attach time and at a time of intra-LTE handover. In addition, MME 120 authenticates UE 102 (e.g., via interaction with HSS 122). Non-access stratum (NAS) signaling terminates at MME 120 and MME 120 generates and allocates temporary identities to UEs (e.g., UE 102).

Furthermore, MME 120 may check authorization of UE 102 to connect to a service provider's Public Land Mobile Network (PLMN) and may enforce roaming restrictions for UE 102. MME 120 may be a termination point in EPC network 106 for ciphering/integrity protection for NAS signaling and may handle security key management. MME 120 may provide a control plane function for mobility between LTE and second generation mobile telecommunications or third mobile generation telecommunications (2G/3G) 3GPP access networks with an S3 interface (i.e., an interface that provides the connection between a serving general packet radio service (GPRS) support node (SGSN) and MME 120 in an LTE network) terminating at MME 120. MME 120 may also terminate an S6a interface (which enables transmission of subscription and authentication data) towards HSS 122 for roaming UEs.

HSS/AAA 122 is configured to include a master user database that supports devices on PDN 110 that handle calls, such as proxy devices, session border controllers, etc. HSS/AAA 122 may contain subscription-related information (e.g., subscriber profiles), may perform authentication and authorization of a user based on requests received from MME 120, and may provide information about a subscriber's location and IP information.

SGW 124 routes and forwards user data packets, acts as a radio mobility anchor for a user plane during inter-eNB handovers, and also acts as an radio anchor for mobility between LTE and other 3GPP technologies (referred to as "inter-3GPP mobility"). As shown, SGW 124 is connected to eNBs 114 to provide a radio layer mobility control plane. In addition, SGW 124 manages and stores contexts associated with UE 102 (e.g., parameters of an IP bearer service, network internal routing information, etc.).

PCRF 126 provides policy control decision and flow based charging control functionalities. PCRF 126 may provide network control regarding service data flow detection, gating, quality of service (QoS) and flow based charging, etc. PCRF 126 may determine how a certain service data flow shall be treated, and may ensure that user plane traffic mapping and treatment is in accordance with a user's subscription profile.

PGW 128 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 128 provides connectivity of UE 102 to external packet data networks (e.g., to PDN 110) by being a traffic exit/entry point for UE 102. As described briefly above, UE 102 may connect to PGW 128 via one or more tunnels established between eNB 114 and PGW 128, such as one or more GPRS Tunneling Protocol (GTP) tunnels. UE 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies.

BMSC 130 may be a functional entity that manages provision of multicast services or broadcast services to UE 102 and an end-user, such as currently implemented in 2G and 3G MBMS architectures. BMSC 130 may provide an entry point for content providers or other broadcast/multicast source which is external to the network. BMSC 130 may perform authorization, scheduling, and security procedures in support of the multicast services or broadcast services. For example, BMSC 130 may provide authorization for terminals requesting to activate an MBMS service. BMSC 130 may schedule broadcast/multicast sessions. BMSC 130 may also implement integrity and confidentiality protection of MBMS data and may issue MBMS session announcements.

BMSC 130 may support MBMS bearer signaling that sets up and releases context at the establishment and termination of MBMS sessions. BMSC 130 may also support user related signaling, e.g., for multicast session authorization, or user session joining or detaching from multicast sessions.

MBMS GW 132 may send/broadcast MBMS packets to each eNB 114 transmitting the (broadcast or multicast) service. MBMS GW 132 may be a logical entity that is present between BMSC 130 and eNBs 114 in network 100. MBMS GW 132 may be part of another network element, such as a router, etc. MBMS GW 132 may use IP multicast to forward MBMS user data to eNB 114. MBMS GW 132 may perform MBMS session control signaling (e.g., session start/stop) towards the E-UTRAN 112 via MME 120.

In implementations described herein, processes and methods of optimizing performance of multicast/broadcast services at a radio cell edge by providing feedback to FEC values and MCS values may be implemented in network 100.

Figure 2A:
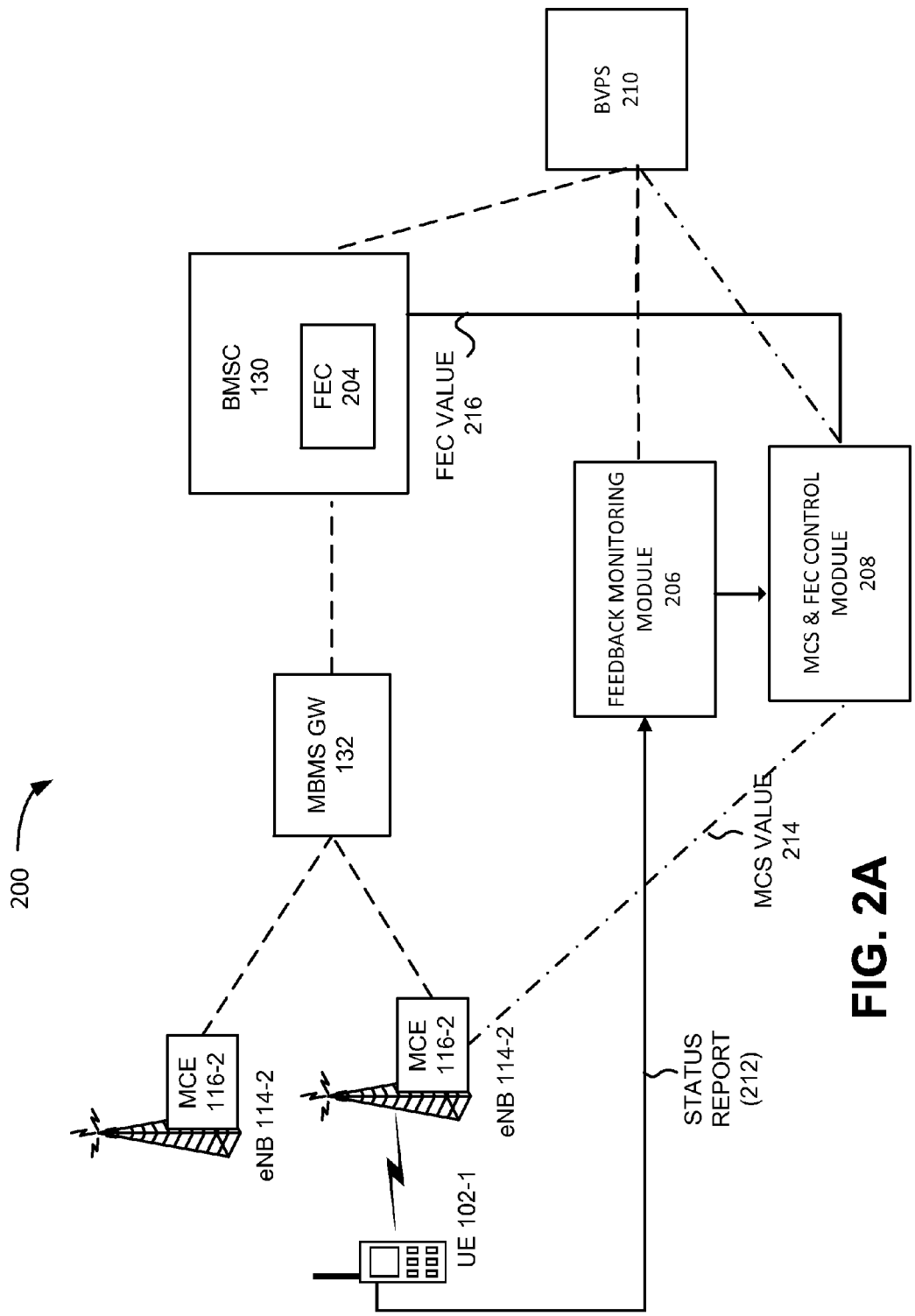
FIG. 2A is a diagram of exemplary communications in a network to provide error protection in an LTE network.
Figure 2B:
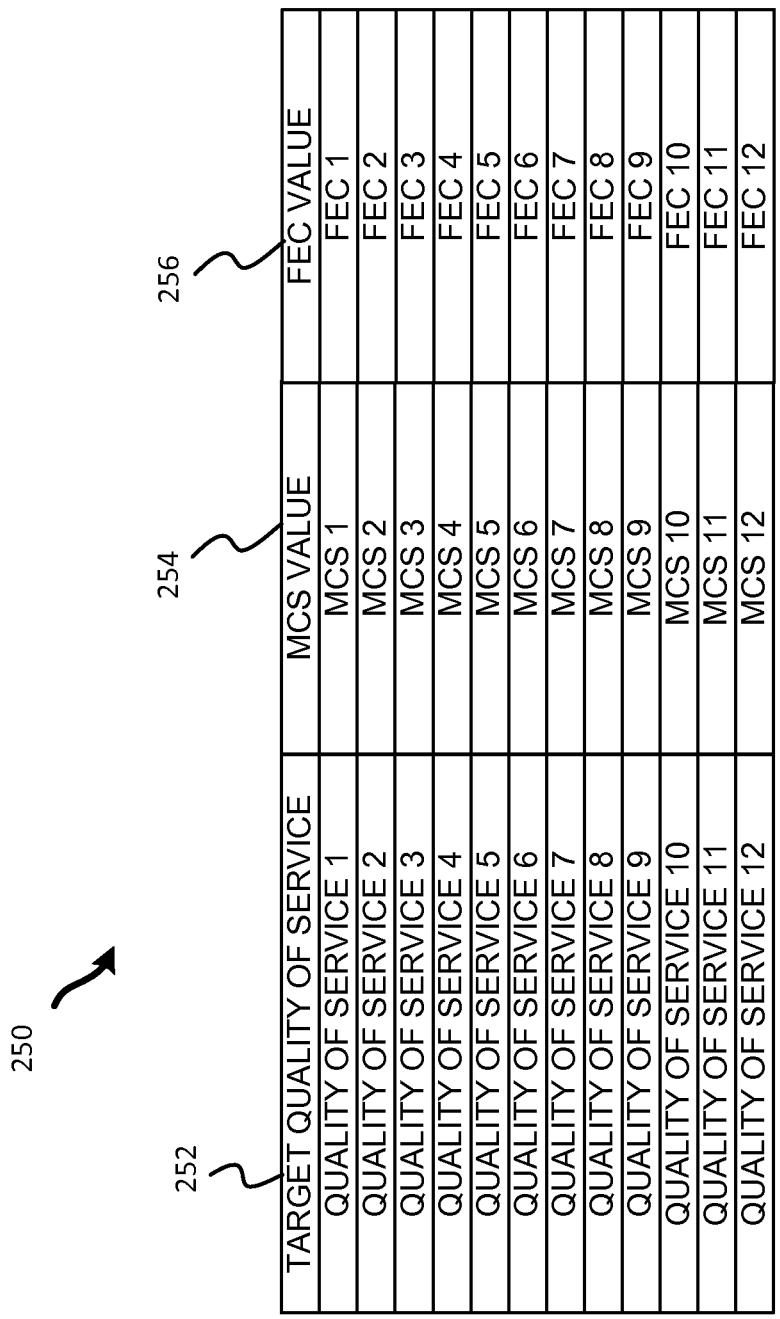
FIG. 2B is an exemplary FEC/MCS optimization table.

FIG. 2A is a diagram of exemplary communications for error protection in a portion 200 of an enhanced multimedia broadcast multicast service (eMBMS) architecture. Communications in FIG. 2A may represent communications to support optimized performance of multicast/broadcast services, for instance at radio cell edge, in an LTE network, such as network 100, shown in FIG. 1. As shown in FIG. 2A, portion 200 may include eNBs 114 and corresponding MCEs 116, UEs 102, BMSC 130, and MBMS GW 132. Additionally, portion 200 includes feedback monitoring module 206, and MCS & FEC control module 208 that may be used for error protection for multicast/broadcast services in portion 200 of an eMBMS architecture. Broadcast video provisioning system (BVPS) 210 may provide beginning FEC and MCS values for a broadcast/multicast. FIG. 2A is described with respect to an FEC/MCS optimization table 250 as shown in FIG. 2B.

As shown in FIG. 2A, when a video delivery session is started, BMSC 130 may receive fixed values of FEC and MCS for a particular multicast/broadcast based on deployed radio topology. In one example, BMSC 130 may receive fixed values of FEC and MCS from BVPS 210. BMSC 130 may receive a particular FEC percentage level of overhead based on data integrity required for particular data, such as software, etc. that is to be transmitted. BVPS 210 may be a system that provisions small cells for eMBMS. BMSC 130 may manage provisioning of multicast services or broadcast services to UE 102 based on the beginning values of FEC and MCS. For example, BMSC 130 may provide a signal (i.e., broadcast packets) that includes FEC of the transmitted data. Additionally, eNBs 114 may use the fixed MCS values to transmit the broadcast/multicast.

UE 102 may receive the broadcast/multicast and periodically provide a status report 212 regarding broadcast packets. The number of UEs 102 that receive this broadcast/multicast may vary, as well as the location of each of the receiving UEs 102 for the broadcast/multicast. The status report 212 may include metrics that identify quality of service characteristics for the broadcast/multicast at each base station (i.e., eNB 114), such as signal to noise ratio (SNR) observed, packet loss percentage, base station identification (BS ID) (i.e., an identification of each eNB 114 that receives the broadcast or multicast) and video stream ID, received signal strength indication (RSSI) and reference signal received power (RSRP).

Feedback monitoring module 206 provides feedback to devices using MCS values and FEC values that may optimize error correction in network 100. Feedback monitoring module 206 may collect status reports 212 from the UEs 102 at predetermined intervals (e.g., at each tenth of a second) for each video stream along with a list of BS IDs for the eNB 114. Feedback monitoring module 206 may determine an average quality of service based on status reports 212 collected over a predetermined time (e.g., by averaging the received value for the quality of service from a preceding predetermined time to the current time) according to response time selected by an administrator for network 100 (e.g., a last one, five, or ten seconds, etc.). Feedback monitoring module 206 may be located in a network element in network 100 or alternatively be a separate network element.

Feedback monitoring module 206 may maintain FEC/MCS optimization table 250 (e.g., as shown in FIG. 2B) that includes combinations of MCS values 254 (e.g. MCS 1 to MCS n as specified in 802.11n MCS index table issued by the Institute of Electrical and Electronics Engineers (IEEE)) and FEC values 256 (% FEC overhead to be added) that correlate to target quality of service values (quality of service 252) for the broadcast/multicast. Combinations of FEC values 256 and MCS values 254 and target quality of service 252 in table 250 may be adjusted based on feedback provided to feedback monitoring module 206. For example, quality of service values 252 may include multiple values for different indicators of radio conditions, such as packet loss and other values that are provided by UE 102 in the status report. FEC/MCS optimization table 250 may include predefined values for different radio parameters and observed packet loss, along with particular application types. For example, FEC/MCS optimization table 250 may include target quality of service values 252 ranging from quality of service 1 to quality of service 12 for broadcast/multicast streams, such as file transfers requiring data integrity, streaming video, and streaming audio.

File transfers may be classified based on an acceptable level of packet loss and a requirement for data integrity for the file transfer. File transfers requiring data integrity may correspond to a relatively higher level of error protection, such as a lower MCS index and a highest FEC overhead. The transmission of file transfers requiring data integrity at lower MCS index and a highest FEC overhead may thereby substantially minimize a requirement for unicast recovery. Quality of service values 252 for streaming video transfers, which do not require data integrity, may be selected based on a level of acceptable packet loss determined by an administrator for network 100 (e.g., based on quality of service agreements, etc.). Similarly, target quality of service values may be selected for streaming audio, which also does not require data integrity, and may tolerate some packet loss.

According to one implementation, feedback monitoring module 206 may adjust values in the FEC/MCS optimization table 250 based on observed current quality of service values and current FEC values and MCS values. For example, if the observed current quality of service values (received from UE 102) are lower than indicated in the FEC/MCS optimization table 250 for current data transmissions in network 100, feedback monitoring module 206 may adjust the target MCS 254 and FEC values 256 based on network resource availability, etc.

Feedback monitoring module 206 may determine adjusted FEC and MCS values for broadcast/multicast transmissions based on averaged received packet loss (e.g., received in status reports 212) and type of content delivered and current FEC and MCS values. Content that requires data integrity (e.g., file delivery for a device software upgrade) may be provided relatively higher FEC values. Feedback monitoring module 206 may derive optimal FEC and MCS values that correlate to a target quality of service and provide these adjusted values to MCS and FEC Control Module 208. In other words, feedback monitoring module 206 may identify the adjusted FEC value 216 and the adjusted MCS value 214 corresponding to the target quality of service value based on a correspondence between the current quality of service and the current FEC value and the current MCS value.

MCS and FEC Control Module 208 may include an enhanced control plane interface to BMSC 132 and eNBs 114. MCS and FEC Control Module 208 may provide adjusted FEC value 216 to BMSC 130 corresponding to the broadcast/multicast. Based on this adjusted FEC value 216, an LTE bearer rate for the broadcast/multicast may vary (due to increased or decreased overhead), which may result in LTE bearer modifications with different maximum bit rate/guaranteed bit rate (MBR/GBR) values for the broadcast/multicast.

MCS and FEC Control Module 208 may provide adjusted MCS value 214 along with stream ID for video communication to eNB 114. MCS and FEC Control Module 208 may provide different MCS values 214 that may be used to identify MCS to provide different broadcast/multicast streams (e.g., video stream may be delivered with MCS 4 (i.e., modulation and coding of the video stream may be provided as specified under MCS 4) and a device software upgrade through broadcast may be delivered with MCS 2).

Figure 3:
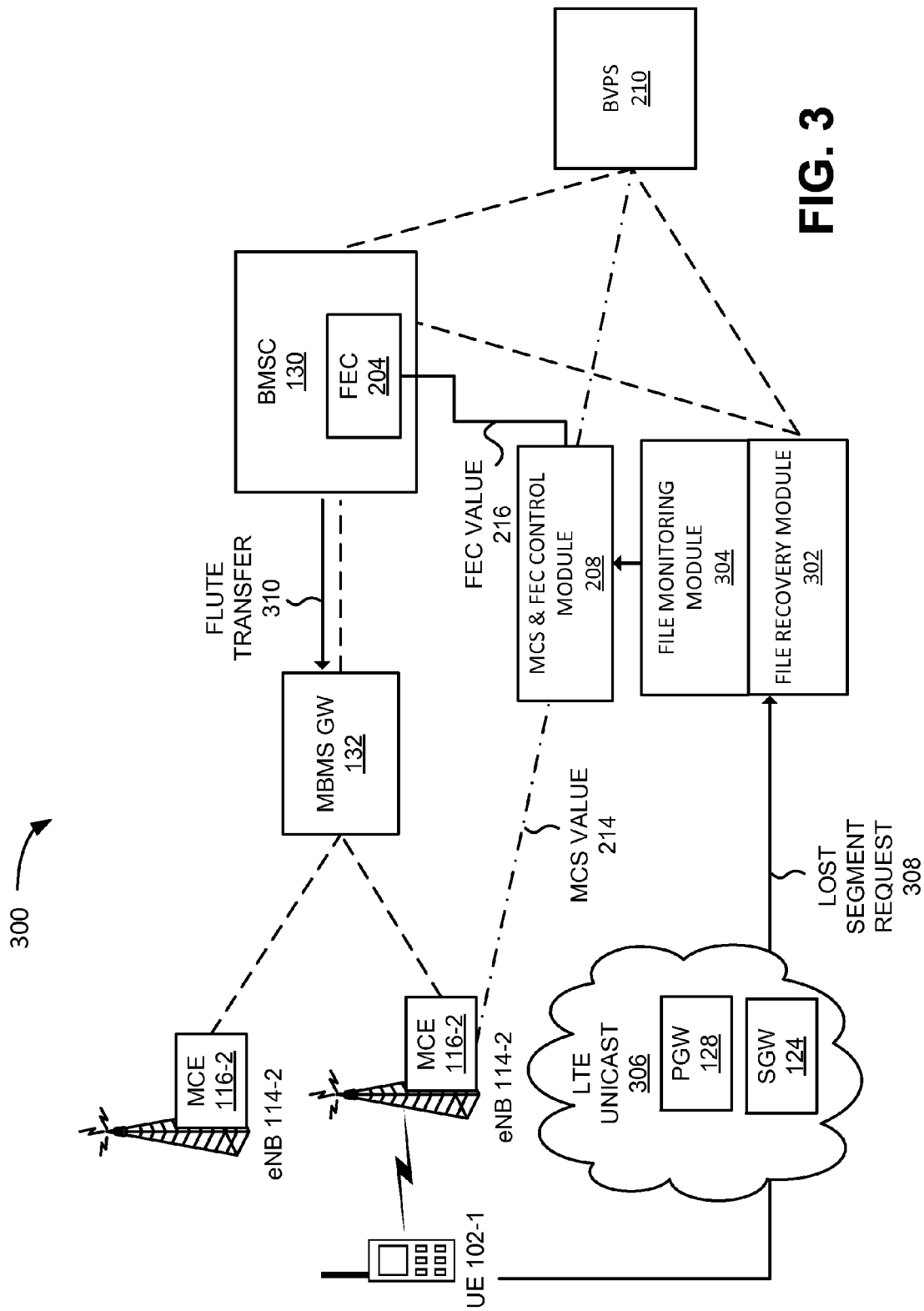
FIG. 3 is a diagram of exemplary communications in a network to provide error protection in an LTE network.

FIG. 3 is a diagram of exemplary communications for error protection in a portion 300 of an eMBMS architecture. Communications in FIG. 3 may represent communications to support optimized performance of multicast/broadcast services for files requiring data integrity in an LTE network, such as network 100, shown in FIG. 1. As shown in FIG. 3, portion 300 may include eNBs 114 and corresponding MCEs 116, UEs 102, BMSC 130, MBMS GW 132, and BVPS 210. Additionally, portion 300 includes MCS & FEC control module 208, file recovery module 302, file monitoring module 304, which may be used for file recovery and error protection for multicast/broadcast services in portion 300 of an eMBS architecture.

As shown in FIG. 3, when a video delivery session is started, BMSC 130 may receive fixed values of FEC and MCS for a particular multicast/broadcast based on deployed radio topology. Similarly as described with respect to FIG. 2 and portion 200, BMSC 130 may receive fixed values of FEC and MCS from BVPS 210. However, an additional mechanism of error protection may be applied as shown in portion 300 when the broadcast/multicast content requires data integrity. The file recovery mechanism executed by file recovery module 302 may support file recovery or report of lost segments.

File recovery module 302 may receive lost segment requests 308 for broadcast/multicast when BMSC 130 broadcasts/multicasts content that requires relatively high data integrity. Lost segment requests 308 may indicate missing segments for received broadcast/multicast streams at each UE 102. Lost segment requests 308 may be sent by individual UEs 102 using LTE unicast request 306 based on a lost segment for that particular UE 102.

File recovery module 302 may direct BMSC 130 to transfer the lost segment for particular UEs 102, for example, using broadcast via file delivery over unidirectional transport (FLUTE) protocol 310, documented in Internet engineering task force (IETF) request for comments (RFC) 3926. BMSC 130 may transfer the lost segments based on different time scales involved in the feedback that may range from a few seconds to minutes. For example, for lost moving pictures experts group (MPEG) backed dynamic adaptive streaming over hypertext transfer protocol (HTTP) (MPEG-DASH), segment size may range from 1-5 seconds, which may be a length of a lowest feedback loop. However, feedback loops may extend from a few seconds to a few minutes.

Multiple requests for lost segments 308 from UEs 102 may result in relatively high unicast traffic based on radio conditions. File monitoring module 304 may monitor lost segment requests 308 and compile statistics of number of requests for retransmissions of lost segments over predetermined intervals.

File monitoring module 304 may determine adjusted MCS values 214 and FEC values 216 corresponding to target levels of lost segment requests 308. File monitoring module 304 may determine a target level of unicast traffic (for lost segments reports 308) that corresponds to this target level of lost segments and adjust the MCS values 214 and FEC values 216 accordingly. File monitoring module 304 may output the adjusted MCS values 214 and FEC values 216 to MCS & FEC control module 208, similarly as described with respect to feedback monitoring module 206 and FIG. 2.

MCS and FEC Control Module 208 may provide adjusted MCS value 214 along with stream ID for video communication to eNB 114. MCS and FEC Control Module 208 may provide different MCS values 214 that may be used to provide different broadcast/multicast streams.

Figure 4:
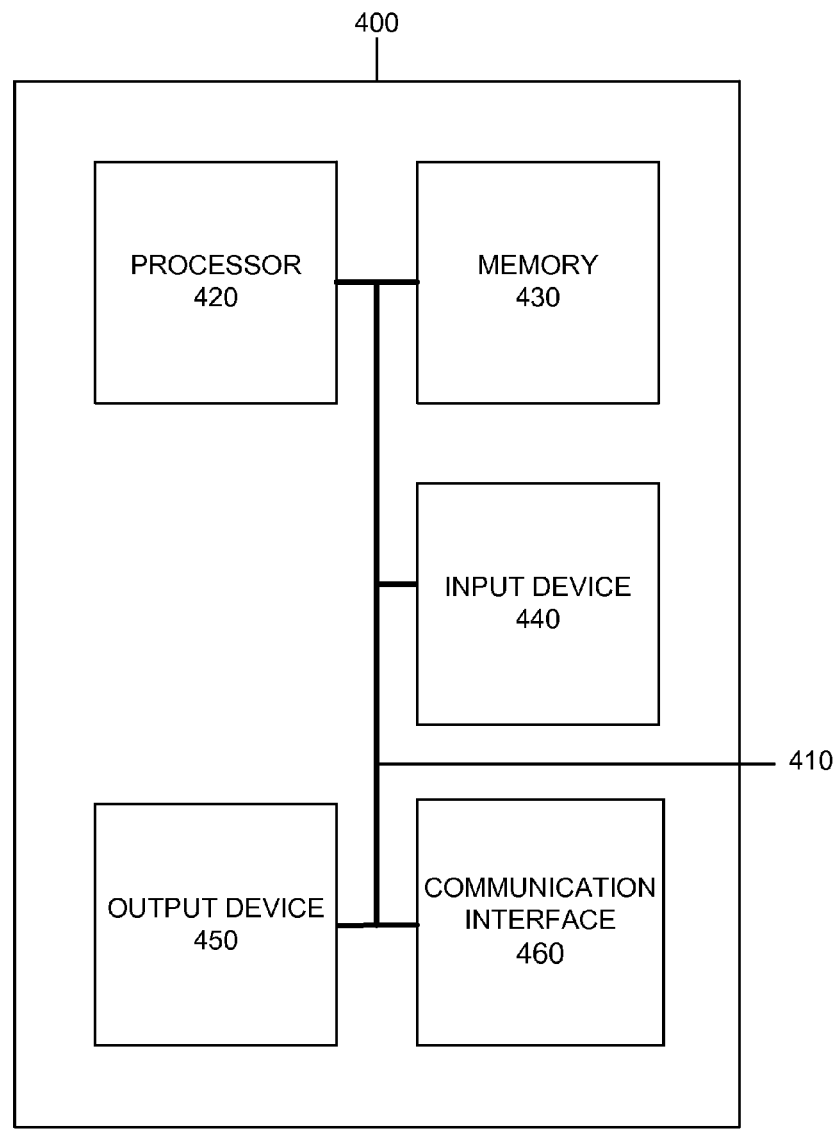
FIG. 4 is a block diagram of exemplary components of a device that may correspond to one of the devices of FIGS. 1-3.

FIG. 4 is a diagram of exemplary components of a device 400 that may correspond to UE 102, one or more devices in AN 104, EPC 106, PDN 110, E-UTRAN 112, eNB 114, MME 120, HSS 122, SGW 124, PCRF 126, PGW 128, BMSC 130, MBMS GW 132, feedback monitoring module 206, MCS & FEC control module 208, file recovery module 302, file monitoring module 304, and BVPS 210, as described in FIGS. 1-3 above. Each of UE 102, access network 104, EPC 106, PDN 110, E-UTRAN 112, eNB 114, MME 120, HSS 122, SGW 124, PCRF 126, PGW 128, BMSC 130, MBMS GW 132, feedback monitoring module 206, MCS & FEC control module 208, file recovery module 302, file monitoring module 304, and BVPS 210 may include one or more devices 400. As shown in FIG. 4, device 400 may include a bus 410, a processor 420, a memory 430, an input device 440, an output device 450, and a communication interface 460.

Bus 410 may permit communication among the components of device 400. Processor 420 may include one or more processors or microprocessors that interpret and execute instructions. In other implementations, processor 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processor 420, a read only memory (ROM) or another type of static storage device that stores static information and instructions for the processor 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include one or more transceivers that enables device 400 to communicate with other devices and/or systems. For example, communication interface 460 may include mechanisms for communicating with other devices, such as other devices of network 100.

As described herein, device 400 may perform certain operations in response to processor 420 executing software instructions contained in a computer-readable medium, such as memory 430. A computer-readable medium may include a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5:
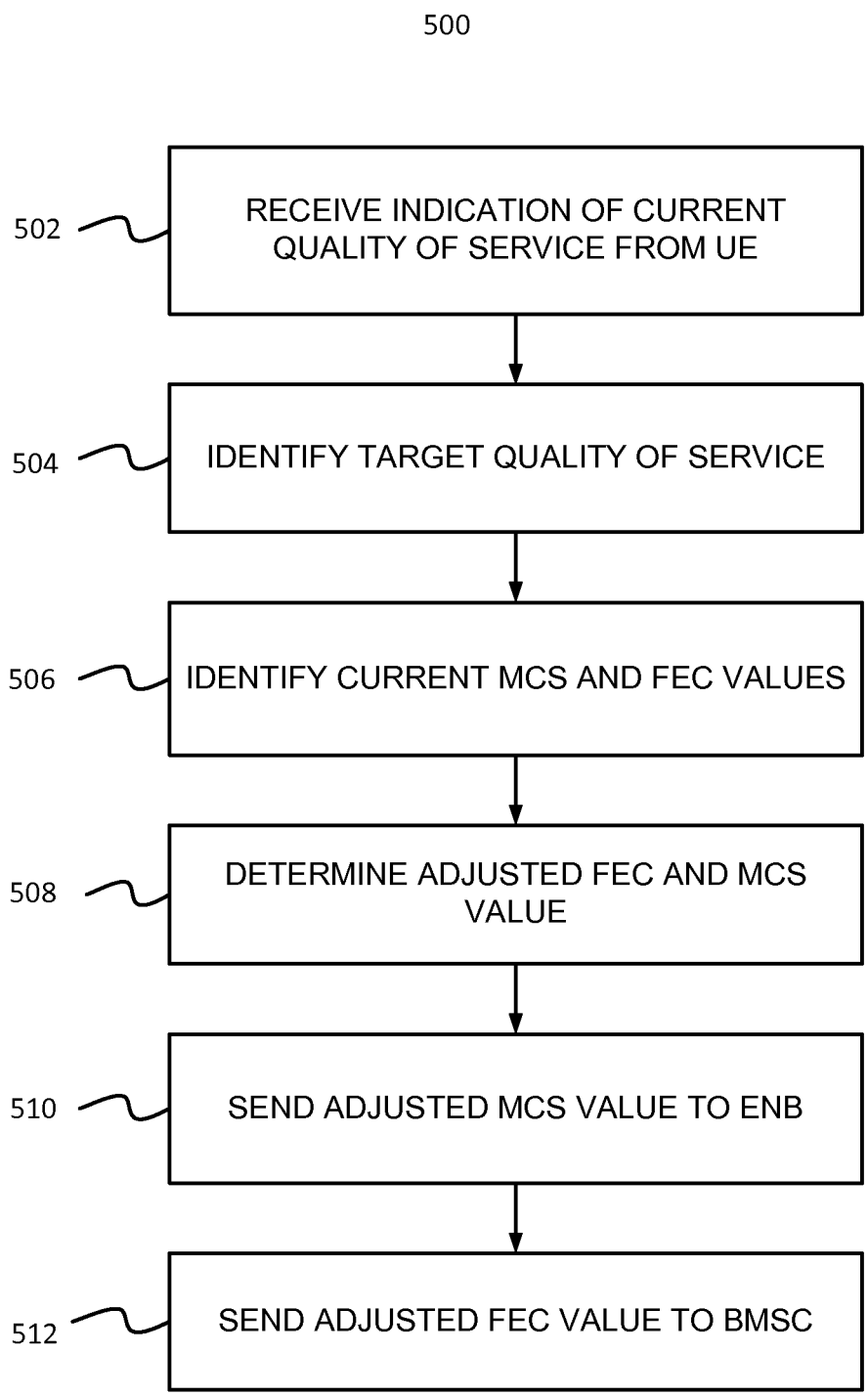
FIG. 5 is a flow chart of an exemplary process exemplary process for error protection of a broadcast/multicast transmission according to an implementation described herein.

FIG. 5 is a flow chart of an exemplary process for error protection of a broadcast/multicast transmission according to implementations described herein. Process 500 is described with respect to portion 200 of an eMBMS architecture shown in FIG. 2A, for illustrative purposes. In one implementation, process 500 may be performed by feedback monitoring module 206, and MCS & FEC control module 208. In another implementation, some or all of process 500 may be performed by another device or group of devices, including or excluding feedback monitoring module 206, and MCS & FEC control module 208. Process 500 may occur in a repeating cycle and some blocks of process 500 (e.g., block 504 and block 506) may be rearranged in a single iteration of process 500.

Processing may begin with feedback monitoring module 206 receiving an indication of current quality of service (e.g., in a status report 212) from UEs 102 (block 502). For example, feedback monitoring module 206 may receive status reports 212 at predetermined intervals.

At block 504, feedback monitoring module 206 may identify a target quality of service for the multicast/broadcast transmission in network 100. For example, feedback monitoring module 206 may receive the target quality of service from an administrator for network 100. Alternatively, feedback monitoring module 206 may determine the target quality of service based on an averaged received packet loss and type of content delivered that is acceptable in network 100 (or portion 200) (i.e., a maximum packet loss allowed). Additionally, feedback monitoring module 206 may determine the target quality of service based on a target SNR, target RSSI, or target RSRP.

At block 506, feedback monitoring module 206 may identify current MCS values 214 and FEC values 216 for the broadcast/multicast transmission in network 100 (block 506). For example, feedback monitoring module 206 may receive initial seeding parameters from BVPS 210 that include MCS values 214 and FEC values 216 for the broadcast/multicast transmission in network 100. Alternatively, feedback monitoring module 206 may retain prior MCS values 214 and FEC values 216, such as MCS values 214 and FEC values 216 output to BMSC 130 and eNBs 114 in a preceding iteration of process 500 at blocks 510 and 512.

Feedback monitoring module 206 may determine adjusted MCS values 214 and adjusted FEC values 216 (block 508). For example, feedback monitoring module 206 may determine adjusted MCS values 214 and FEC values 216 that correlate to the target quality of service. Feedback monitoring module 206 may determine adjusted MCS values 214 and FEC values 216 by using FEC/MCS optimization table 250 that may include predefined values for different radio parameters and observed packet loss along with particular application types, and corresponding MCS values 214 and FEC values 216.

MCS and FEC Control Module 208 may send the adjusted MCS values to eNBs 114 (block 510). For example, MCS and FEC Control Module 208 may output the adjusted MCS values to eNBs 114 based on identification provided in the status reports 212. eNBs 114 may apply modulation and coding for the multicast/broadcast based on the MCS index value.

MCS and FEC Control Module 208 may also output the adjusted FEC values to BMSC 130 (block 512). BMSC 130 may apply the adjusted FEC to the multicast/broadcast transmission.

Figure 6:
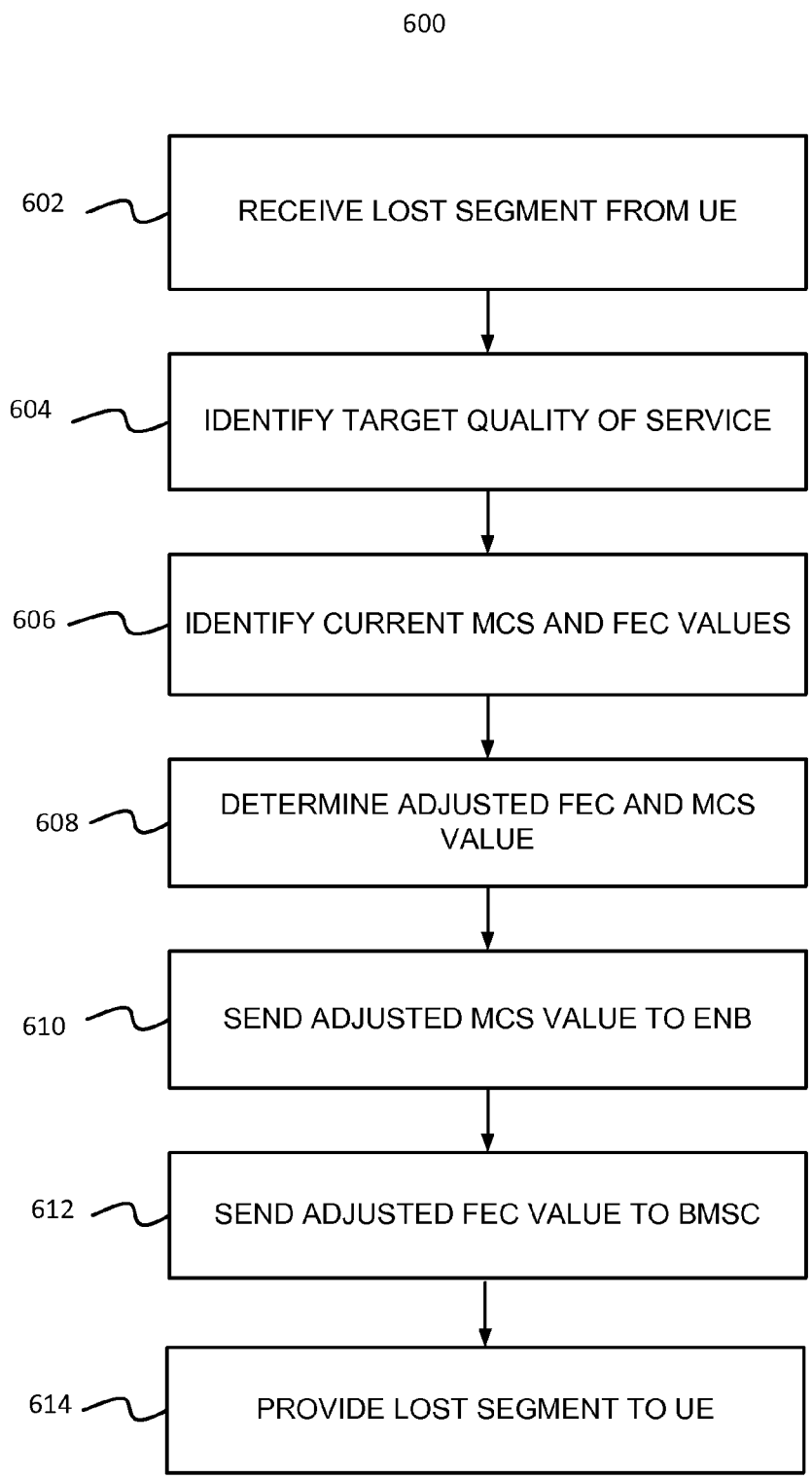
FIG. 6 is a flow chart of another exemplary process to provide error protection in an LTE network according to an implementation described herein.

FIG. 6 is a flow chart of an exemplary process for file recovery and error protection of a multicast/broadcast transmission according to implementations described herein. Process 600 is described with respect to portion 300 of an eMBMS architecture shown in FIG. 3, for illustrative purposes. In one implementation, process 600 may be performed by file recovery module 302, in conjunction with file monitoring module 304. In another implementation, some or all of process 600 may be performed by another device or group of devices, including or excluding file recovery module 302 and file monitoring module 304.

As shown in FIG. 6, file recovery module 302 may receive a lost segment 308 request from a UE 102 (block 602).

At block 604, file monitoring module 304 may identify a target quality of service for the multicast/broadcast. For example, file monitoring module 304 may receive the target quality of service from an administrator for network 100. Alternatively, file monitoring module 304 may automatically determine the target quality of service based on a number of lost segment requests 308 for retransmissions that is acceptable in network 100 (or portion 300).

File monitoring module 304 may identify current MCS values 214 and FEC values 216 for the broadcast/multicast (block 606). File monitoring module 304 may determine adjusted MCS values 214 and adjusted FEC values 216 (block 608). For example, file monitoring module 304 may determine adjusted MCS values 214 and FEC values 216 that correlate to target quality of service. File monitoring module 304 may determine adjusted MCS values 214 and FEC values 216 by using FEC/MCS optimization table 250.

MCS and FEC Control Module 208 may output the adjusted MCS values to eNBs 114 (block 610). eNBs 114 may apply modulation and coding for the multicast/broadcast based on the MCS value.

MCS and FEC Control Module 208 may also output the adjusted FEC values to BMSC 130 (block 612). BMSC 130 may apply the adjusted FEC to the multicast/broadcast.

At block 614, file recovery module 302 may direct BMSC 130 to transfer the lost segment for the UE 102, for example, using the FLUTE protocol.

Systems and/or methods described herein may provide error protection and recovery in a network. The error protection may be provided based on observed quality of service at UEs 102 in network 100. Recovery may be implemented using LTE unicast for file transfers that require data integrity.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 5 and 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:
1. A computer-implemented method comprising:
receiving an indication of current quality of service for a transmission received by at least one user equipment (UE) from at least one base station;

identifying a target quality of service value for the transmission;
identifying a current forward error correction (FEC) value and a current modulation and coding scheme (MCS) value for the transmission;
determining an adjusted FEC value and an adjusted MCS value based on the current FEC value and the current MCS value, the indication of current quality of service, and the target quality of service value;
outputting the adjusted FEC value to a broadcast multicast service center (BMSC); and
outputting the adjusted MCS value to the at least one base station.

2. The computer-implemented method of claim 1, wherein receiving the indication of current quality of service further comprises:
receiving one or more of an observed signal to noise ratio (SNR), a packet loss percentage, a base station identification (BS ID), a video stream ID, received signal strength indication (RSSI), or a reference signal received power (RSRP).

3. The computer-implemented method of claim 1, wherein receiving the indication of current quality of service further comprises:
receiving an indication of a lost segment of content via unicast transmission.

4. The computer-implemented method of claim 3, further comprising:
providing the lost segment with the transmission via file delivery over unidirectional transport (FLUTE) protocol.

5. The computer-implemented method of claim 3, wherein determining the adjusted FEC value and the adjusted MCS value, further comprises:
determining the adjusted FEC value and the adjusted MCS value based on a target level of unicast traffic for lost segments.

6. The computer-implemented method of claim 1, wherein the transmission is one of a broadcast or a multicast.

7. The computer-implemented method of claim 1, further comprising:
receiving the indication of current quality of service via a long term evolution network unicast.

8. The computer-implemented method of claim 1, wherein receiving the indication of current quality of service further comprises:
receiving a status report indicating a value for the quality of service at predetermined intervals; and
averaging the received values for the quality of service over a period of time to determine the current quality of service.

9. The computer-implemented method of claim 1, wherein determining the adjusted FEC value and the adjusted MCS value, further comprises:
identifying the current FEC value and the current MCS value; and
identifying the adjusted FEC value and the adjusted MCS value corresponding to the target quality of service value based on a correspondence between the current quality of service and the current FEC value and the current MCS value.

10. The computer-implemented method of claim 1, wherein identifying a target quality of service value for the transmission further comprises:
identifying the target quality of service value based on one or more of a requirement for data integrity and a level of acceptable packet loss.

11. A device, comprising:
a memory to store a plurality of instructions; and
a processor configured to execute instructions in the memory to:
receive an indication of current quality of service for a transmission received by at least one user equipment (UE) from at least one base station;
identify a target quality of service value for the transmission;
identify a current forward error correction (FEC) value and a current modulation and coding scheme (MCS) value for the transmission;
determine an adjusted FEC value and an adjusted MCS value based on the current FEC value and the current MCS value, the indication of current quality of service, and the target quality of service values;
output the adjusted FEC value to a broadcast multicast service center (BMSC), wherein the BMSC applies the adjusted FEC value to the transmission; and
output the adjusted MCS value to the base station.

12. The device of claim 11, wherein the indication of current quality of service includes one or more of observed signal to noise ratio (SNR), packet loss percentage, base station identification (BS ID), video stream ID, received signal strength indication (RSSI), or reference signal received power (RSRP).

13. The device of claim 11, wherein, when receiving the indication of current quality of service, the processor is further configured to:
receive an indication of a lost segment of content via unicast transmission.

14. The device of claim 13, wherein the processor is further configured to provide the lost segment with the transmission via file delivery over unidirectional transport (FLUTE) protocol.

15. The device of claim 13, wherein, when determining the adjusted FEC value and the adjusted MCS value, the processor is further configured to:
determine the adjusted FEC value and the adjusted MCS value based on a target level of unicast traffic for lost segments.

16. The device of claim 11, wherein the base station comprises an enhanced node base station (eNodeB).

17. The device of claim 11, wherein, when receiving the indication of current quality of service, the processor is further configured to:
receive a status report indicating a value for the quality of service at predetermined intervals; and
average the received values for the quality of service over a period of time to determine the current quality of service.

18. The device of claim 11, wherein, when determining the adjusted FEC value and the adjusted MCS value, the processor is further configured to:
identify the current FEC value and the current MCS value; and
identify the adjusted FEC value and the adjusted MCS value corresponding to the target quality of service values based on a correspondence between the current quality of service and the current FEC value and the current MCS value.

19. A non-transitory computer-readable medium including instructions to be executed by a processor, the instructions including one or more instructions, when executed by the processor, for causing the processor to:
receive an indication of current quality of service for a transmission received by at least one user equipment (UE) from at least one base station, wherein the indication of current quality of service includes one or more of observed signal to noise ratio (SNR), packet loss percentage, base station identification (BS ID), video stream ID, received signal strength indication (RSSI), or reference signal received power (RSRP);

identify target quality of service values for the transmission;

identify a current FEC value and a current MCS value for the transmission;

determine an adjusted FEC value and an adjusted MCS value based on the current FEC value and the current MCS value, the indication of current quality of service, and the target quality of service values;

output the adjusted FEC value to a broadcast multicast service center (BMSC) for the transmission; and output the adjusted MCS value to the at least one base station.

20. The non-transitory computer-readable medium of claim 19, wherein, when receiving the indication of current quality of service, the one or more instructions further includes instructions to:

receive an indication of a lost segment of content via long term evolution unicast transmission.

\* \* \* \* \*